(12) United States Patent
Jacobsen et al.

(10) Patent No.: US 8,794,262 B2
(45) Date of Patent: *Aug. 5, 2014

(54) QUANTUM FLUID TRANSFER SYSTEM

(75) Inventors: Stephen C. Jacobsen, Salt Lake City, UT (US); Shane Olsen, Farmington, UT (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/590,007

(22) Filed: Aug. 20, 2012

(65) Prior Publication Data

US 2013/0042921 A1    Feb. 21, 2013

Related U.S. Application Data

(63) Continuation of application No. 12/151,974, filed on Nov. 13, 2008, now Pat. No. 8,245,728.

(60) Provisional application No. 60/928,293, filed on May 8, 2007.

(51) Int. Cl.
F16K 11/07    (2006.01)

(52) U.S. Cl.
USPC ..................................... 137/599.08; 137/597

(58) Field of Classification Search
USPC ................... 137/599.08, 625.34, 597, 625.64
See application file for complete search history.

(56) References Cited

U.S. PATENT DOCUMENTS

| | | | |
|---|---|---|---|
| 3,804,120 A | 4/1974 | Garnett | |
| 4,513,653 A | 4/1985 | Varlemann | |
| 4,598,626 A * | 7/1986 | Walters et al. | 91/433 |
| 4,790,233 A * | 12/1988 | Backe et al. | 91/361 |
| 5,385,171 A * | 1/1995 | Cleasby | 137/625.64 |
| 5,921,279 A | 7/1999 | Barber | |
| 2004/0099320 A1 | 5/2004 | Oniduka | |
| 2008/0245424 A1 | 10/2008 | Jacobsen et al. | |

FOREIGN PATENT DOCUMENTS

| | | |
|---|---|---|
| DE | 10 2005 029821 | 10/2006 |
| EP | 0573191 | 12/1993 |
| FR | 2530773 | 1/1984 |
| GB | 1526630 | 9/1978 |
| JP | S40-76466 | 12/1965 |
| JP | S46-23488 | 3/1971 |
| JP | S48-44902 | 12/1973 |
| JP | 54 03662 | 3/1979 |
| JP | S54-57078 | 5/1979 |
| JP | 61184279 | 8/1986 |

* cited by examiner

*Primary Examiner* — Kevin Lee
*Assistant Examiner* — R. K. Arundale
(74) *Attorney, Agent, or Firm* — Thorpe North & Western LLP

(57) ABSTRACT

A miniature quantum fluid transfer system configured to regulate the flow rate of a fluid by allowing passage of small, discrete increments of fluid through the valve including a valve body having at least one inlet to receive fluid and at least one outlet to release fluid, and a valve rod movably disposed in a first chamber in the valve body. The valve rod has a plurality of fluid passages spaced longitudinally along the valve rod, and the valve rod is movable to align each fluid passage with an inlet or outlet port in the first chamber to allow fluid to flow through selected inlet or outlet ports corresponding to selected fluid passages. The quantum fluid transfer system has a plug movably disposed in a second chamber to push a corresponding volume of fluid out of the second chamber at the end opposite the end the fluid entered.

21 Claims, 7 Drawing Sheets

QUANTUM FLUID TRANSFER SYSTEM

RELATED APPLICATIONS

This application is a continuation application claiming the benefit of U.S. patent application Ser. No. 12/151,974, filed May 8, 2008, entitled, "QUANTUM FLUID TRANSFER SYSTEM," which claims the benefit of U.S. Provisional Patent Application Ser. No. 60/928,293, entitled, "QUANTUM FLUID TRANSFER SYSTEM," filed on May 8, 2007, each of which are incorporated by reference in their entirety and made a part hereof.

FIELD OF THE INVENTION

This invention relates to fluid flow systems, valves, and valving systems, and more particularly to a quantum fluid control system comprising a quantum valve, wherein the quantum valve may be combined with a directional valve to control and operate an actuator or actuator system, preferably within a micro miniature environment, such as a MEMS environment.

BACKGROUND OF THE INVENTION AND RELATED ART

Analog and digital valves are well known. Generally, analog valves regulate flow by opening or closing a valve gate until the desired flow rate is realized. Some analog valves can be adjusted manually by turning a valve stem. Other analog valves can be adjusted automatically by electric, pneumatic, or hydraulic actuators that can open or close the valve gates using sensors which detect the valve gate position.

Unfortunately, analog valves have limitations that can be problematic in many valve applications. For example, mechanical clearances, friction in valve linkages, fluid forces acting on the valve gate and stem can result in uncertainty in the valve setting and can result in unpredictable fluid flow when changes in the valve are made. Additionally, analog valves can be too slow in making changes to fluid flow conditions for rapid response applications such as hydraulic actuators.

Digital valves seek to overcome the deficiencies of analog valves. For example, some digital valves regulate fluid flow with a series of valves having electronic gates operated independently by an electrical signal. Each valve can be opened or closed very quickly to increase or decrease fluid flow by the number of valves that are open. Thus, a flow rate can be achieved by opening the proper valve or combination of valves. A control system, such as a computer or the like, can be used to control the flow rate.

Unfortunately, many digital valves have limitations that can be problematic in many valve applications. For example, complex fluid systems can have fluid flow forces, mechanical interactions, and electrical forces that affect the fluid flow stream control accuracy. Additionally, these forces can make it hard to proportionally control fluid flow from typical digital valves. For example, high pressure hydraulic fluid in a miniature hydraulic system can interfere with valve linkages and gates such that the gates cannot be closed to affect a proportional fluid flow.

SUMMARY OF THE INVENTION

In light of the problems and deficiencies inherent in the prior art, the present invention seeks to overcome these by creating quantum discrete or digitized packets of fluid to create a proportionally controllable fluid flow.

In accordance with the invention as embodied and broadly described herein, the present invention resides in a miniature quantum fluid transfer system configured to regulate the flow rate of a fluid by allowing passage of very small, discrete increments of fluid through the valve including a valve body having at least one inlet to receive fluid and at least one outlet to release fluid. The quantum fluid transfer system can include a valve rod movably disposed in a first chamber in the valve body. The valve rod can have a plurality of fluid passages spaced longitudinally along the valve rod, and the valve rod can be movable to align each fluid passage with an inlet or outlet port in the first chamber to allow fluid to flow through selected inlet or outlet ports corresponding to selected fluid passages. The quantum fluid transfer system can also have a plug movably disposed in a second chamber in the valve body. The plug can be movable between a first end and a second end of the second chamber, and can move toward the first or second end when a volume of fluid enters the second chamber from the first chamber at the other of the first or second end. The plug can push a corresponding volume of fluid out of the second chamber at the end opposite the end the fluid entered.

The present invention also resides in a method for regulating the fluid flow through a valve including obtaining a quantum valve with a first chamber disposed in a valve body and having at least one inlet port and at least one outlet port. The quantum valve can also have a valve rod movably disposed in the first chamber. The valve rod can have a plurality of fluid passages spaced longitudinally along the valve rod. The valve rod can be movable to align at least one of the plurality of fluid passages with one of the inlet ports and at least one of the plurality of fluid passages with one of the outlet ports in order to allow fluid to flow through the selected inlet and outlet ports corresponding to the selected fluid passages. The quantum valve can also have a second chamber disposed in the valve body that can be in fluid communication with the first chamber at a first end and a second end of the second chamber. The quantum valve can also have a plug that can be movably disposed in the second chamber between the first end and the second end. The method for regulating flow can include causing the first chamber to be in fluid communication with a fluid source. The valve rod can be positioned to permit fluid from the source to enter the first chamber and the first end of the second chamber, and to cause the plug to displace within the second chamber to dispense a volume of fluid from a second end of the second chamber.

The present invention still further resides in a quantum fluid transfer and load actuating system, comprising a quantum valve configured to operate with proportionality, and comprising a valve body having at least one pressure inlet to receive pressurized fluid, and at least one return outlet to release fluid, a first chamber disposed in the valve body and having at least one inlet port and at least one outlet port, a valve rod movably disposed in the first chamber and having a plurality of fluid passages adapted to facilitate fluid flow through the first chamber through the inlet and outlet ports, a second chamber disposed in the valve body and in fluid communication with the first chamber via the inlet and outlet ports of the first chamber, and a plug movably disposed in the second chamber to output a specified volume of fluid upon displacement; a directional valve operable with the quantum valve to receive the specified volume of fluid as output from the quantum valve, the directional valve operating in a binary or digital manner, rather than in an analog manner, being able to digitally switch between various operating positions upon receipt of the specified volume of fluid; and an actuator operable by the directional valve, the specified volume of fluid output from the quantum valve determining a proportional displacement of the actuator.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention, as represented in FIGS. 1 through 6, is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Generally, the present invention describes a method and system for enabling hydraulics systems, and particularly micro miniature hydraulic systems, to operate in a digital manner to power or control an actuator operating in an analog manner. More specifically, the present invention describes a method and system for generating one or more hydraulic fluid outputs from a quantum valve and providing the fluid output to a directional valve, wherein the directional valve outputs the fluid in a digital manner to actuate an actuator fluidly coupled thereto, or to operate a similar or other structure as known in the art. Essentially, the quantum valve is configured to operate proportionally, or is configured to function as a proportional valve. In addition, although a single quantum valve may be used to generate a given volumetric fluid output, it is contemplated that multiple quantum valves may be operated in combination with one another, such as in series or parallel with one another, to provide different, cumulative, and/or selective outputs depending upon the size and number of quantum valves employed, as well as the operable arrangement of the one or more quantum valves.

Figure 1:
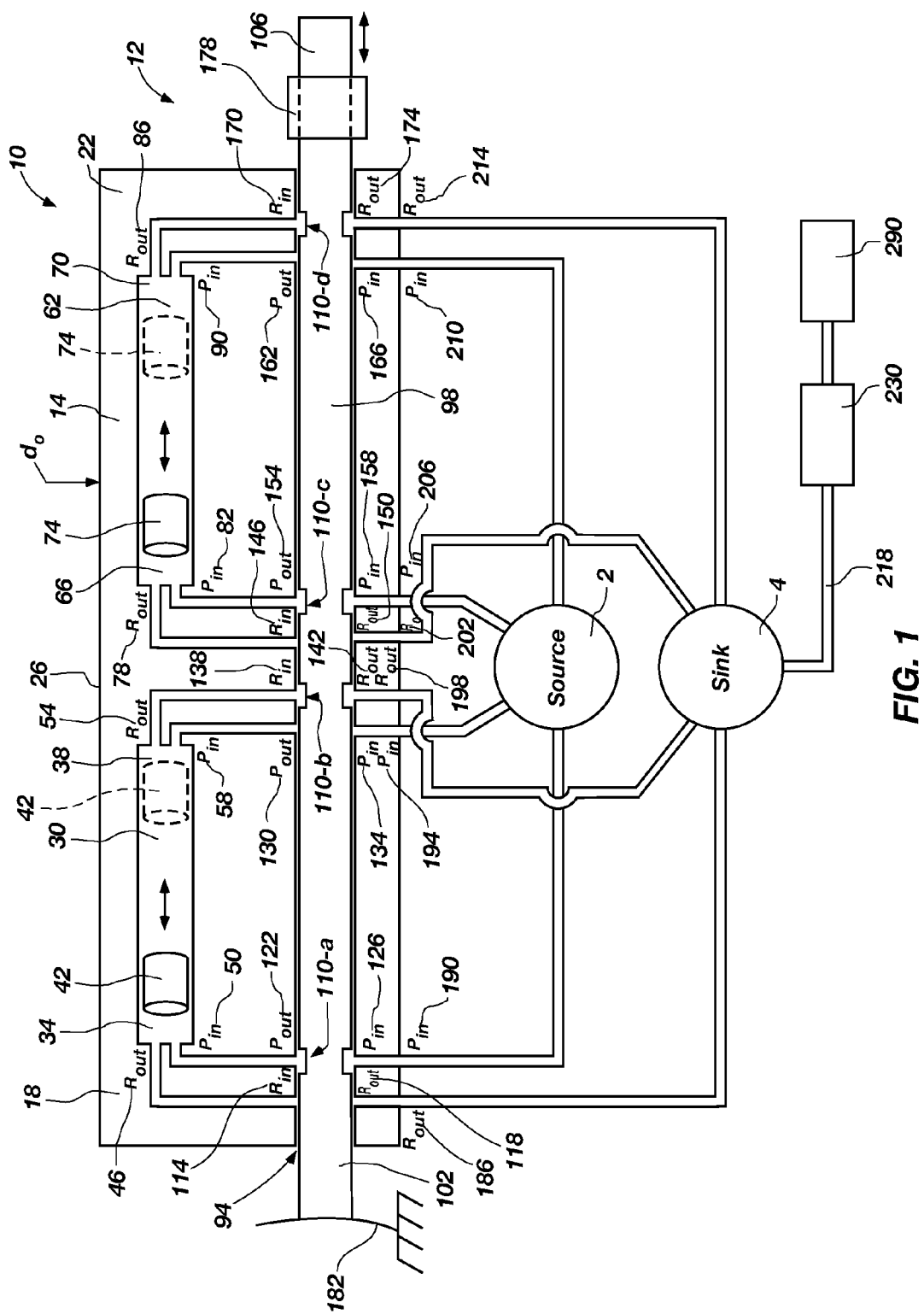
FIG. 1 illustrates a schematic cross section of a miniature quantum fluid transfer system in accordance with an embodiment of the present invention.

With reference to FIG. 1, shown is a schematic diagram of a quantum fluid transfer system according to a first exemplary embodiment of the present invention. Specifically, FIG. 1 illustrates the quantum fluid transfer system 10 as comprising a quantum valve 12 and a directional valve 230 fluidly and operably coupled to the quantum valve 12 through a sink 4. The quantum fluid transfer system 10 may further comprise an actuator 290, which is shown fluidly and operably coupled to the directional valve 230 to be controlled by the fluid output from the directional valve 230. In short, the quantum valve 12 is configured to output a specific volume of fluid to the sink 4, and subsequently or therefore the directional valve 230, as received from a fluid source 2. This volumetric fluid output allows the directional valve 230 to function in a digital manner, allowing discrete, or quantum amounts of fluid through the valve, thus, essentially allowing the quantum fluid transfer system 10, in one exemplary embodiment, to function as a digital hydraulics system.

The quantum valve 12 comprises, as its primary components, an elongate body 14 having a first end 18, a second end 22, an outer surface 26, and an outer diameter $d_o$; at least one fluid displacement bore, with the embodiment shown comprising a first fluid displacement bore 30 and a second fluid displacement bore 62, each contained or formed within the elongate body 14; a spool bore 94, also contained or formed within the elongate body 14; and a series of fluid connections extending between the components of the quantum fluid transfer system 10, particularly the first and second fluid displacement bores 30 and 62, the spool bore 94, a fluid source 2, and a fluid sink 4.

It is noted herein that the quantum fluid transfer system 10, is preferably micro miniature in size, meaning its size and the size of its component parts may be accurately and appropriately measured in millimeters or micrometers. In some exemplary embodiments, the quantum valve 12 may be configured as a micro fluid transfer system, being formed after and utilizing the technology described and claimed in U.S. patent application Ser. No. 12/072,133, filed Feb. 22, 2008 and entitled, "Micro-fluid Transfer System," which is incorporated by reference in its entirety herein. For instance, the length of the elongate body 14 may be between 5 and 20 millimeters, or 5,000 and 20,000 micrometers, while the radius of the elongate body 14, assuming a cylindrical body, may be between 1 and 3 millimeters, or 1,000 and 3,000 micrometers. Obviously, however, components of the quantum valve and the quantum fluid transfer system 10 may be formed or manufactured using other methods and may comprise other size and geometric configurations.

In one exemplary embodiment, the elongate body 14 comprises a glass or ceramic structure that is preferably cylindrical in shape, with a uniform circular cross-section. Of course, the elongate body 14 may be formed of other suitable materials, and may comprise other shapes, as will be recognized by one skilled in the art. For example, the elongate body 14 may comprise a square or rectangular cross-section. In addition, the elongate body 14, and therefore the quantum valve 12, may comprise a single or more than two fluid displacement bores, as well as multiple spool bores.

Formed longitudinally within the elongate body 14 is a first fluid displacement bore 30, which comprises a first end 34, a second end 38, a length, and an inside diameter. As such, the first fluid displacement bore 30 comprises a specific volume defined by the cross-sectional area of the fluid displacement bore 30 multiplied by its length. In other words, the fluid displacement bore 30 comprises a volume $V_{bore,1}$ that is dependent upon the size and shape of the bore. As will be apparent, the size of the fluid displacement bore 30, as well as its position within the elongate body 14, may vary between different quantum valves.

In regards to positioning of the fluid displacement bore 30 within the elongate body 14, in one aspect, the fluid displacement bore 30 may be positioned so that no portion of it is in fluid connection with the outer surface 26 or ends 18 and 22 of the elongate body 14. Stated differently, the fluid displacement bore 30 may be formed so that it is contained within and entirely surrounded by the solid body structure making up the elongate body 14. In another aspect, the fluid displacement bore 30 may be formed to extend from the first end 18 to the second end 22 of the elongate body 14, thus causing the fluid displacement bore 30 to be in fluid connection with the outer surface 26. In addition, the first fluid displacement bore 30 comprises a longitudinal central axis that is parallel, or substantially parallel, to the longitudinal central axis of the elongate body 14.

Slidably disposed or situated within the first fluid displacement bore 30 is a plug or plunger 42. The plug 42 is configured to bi-directionally displace within the fluid displacement bore 30 in response to an input of fluid from the source 2. Preferably, the plug 42 is configured to displace or travel the length of the first fluid displacement bore 30 with the ends of the fluid displacement bore 30 functioning as stoppers for the plug 42. In another aspect, the first fluid displacement bore 30 may comprise one or more stoppers in the form of protrusions extending outward from the interior wall of the fluid displacement bore 30 and strategically placed, which stoppers may function to define and limit the displacement distance of the plug 42 in either direction or both directions. The plug 42 may comprise a solid body structural member sized and configured to fit and slide within the fluid displacement bore 30. As such, the plug 42 comprises a volume $V_{plug}$ that may be calculated by computing the cross-sectional area of the plug (using its outside diameter or surface) multiplied by its length.

FIG. 1 further illustrates, and the quantum valve 12 further comprises, a second fluid displacement bore 62 formed longitudinally within the elongate body 14 in a position coaxial with the first fluid displacement bore 30. Similar to the first fluid displacement bore 30, the second fluid displacement bore 62 comprises a first end 66, a second end 70, a length, and an inside diameter. As such, the second fluid displacement bore 62 comprises a specific volume defined by the cross-sectional area of the second fluid displacement bore 62 multiplied by its length. In other words, the second fluid displacement bore 62 comprises a volume $V_{bore,2}$ that is dependent upon the size and shape of the bore. As will be apparent, the size of the second fluid displacement bore 62, as well as its position within the elongate body 14, may vary between different quantum valves.

In regards to positioning of the second fluid displacement bore 62 within the elongate body 14, in one aspect, the second fluid displacement bore 62 may be positioned so that no portion of it is in fluid connection with the outer surface 26 or ends 18 and 22 of the elongate body 14. Stated differently, and similar to the first fluid displacement bore 30, the second fluid displacement bore 62 may be formed so that it is contained within and entirely surrounded by the solid body structure making up the elongate body 14. In another aspect, the second fluid displacement bore 62 may be formed to extend from the first end 18 to the second end 22 of the elongate body 14, thus causing the second fluid displacement bore 62 to be in fluid connection with the outer surface 26. In addition, the second fluid displacement bore 62 comprises a longitudinal central axis that is parallel, or substantially parallel, to the longitudinal central axis of the elongate body 14.

The first and second fluid displacement bores 30 and 62 each preferably comprises a circular cross-section, and therefore a cylindrical shape, and may be formed in the elongate body 14 in accordance with one of several various known manufacturing methods.

Slidably disposed or situated within the second fluid displacement bore 62 is a plug or plunger 74. The plug 74 is configured to bi-directionally displace within the second fluid displacement bore 62 in response to an input of fluid from the source 2. Preferably, the plug 74 is configured to displace the length of the second fluid displacement bore 62 with the ends of the second fluid displacement bore 62 functioning as stoppers for the plug 74. In another aspect, the second fluid displacement bore 62 may comprise one or more stoppers in the form of protrusions extending outward from the interior wall of the second fluid displacement bore 62 and strategically placed, which stoppers may function to define and limit the displacement distance of the plug 74 in either direction or both directions. The plug 74 may comprise a solid body structural member sized and configured to fit and slide within the second fluid displacement bore 62. As such, the plug 74 comprises a volume $V_{plug}$ that may be calculated by computing the cross-sectional area of the plug (using its outside diameter or surface) multiplied by its length.

Although its presence is not necessary, the second fluid displacement bore 62 functions to balance the operation of the quantum valve 12, as well as to provide an alternative or cumulative fluid output. Moreover, the first and second fluid displacement bores 30 and 62 may be similar in size, thus allowing the quantum valve 12 to operate with the plugs 42 and 74 displacing within the first and second fluid displacement bores 30 and 62 in synchronization with one another to simultaneously output a similar volume of fluid to the sink 4. Alternatively, first and second displacement bores 30 and 62 may be different in size and selectively actuated to output different volumes of fluid.

The quantum valve 12 further comprises at least one spool bore, shown as a spool bore 94, formed within the elongate body 14, as shown. The spool bore 94 is configured to receive a rod or valve rod 98 therein. The valve rod 98 is configured to displace back and forth within the spool bore 94 to open and close the various input and output ports of the spool bore 94. As such, the spool bore 94 and valve rod 98 function together as a spool valve contained within the elongate body 14 of the quantum valve 12. The spool valve functions with the fluid displacement bore(s) 30 and 62 to make up the quantum valve 12 and, depending upon the frequency of actuation, to control the amount of fluid output to the directional valve, as will be discussed in greater detail below.

The spool bore 94 extends longitudinally within the elongate body 14 from the first end 18 to the second end 22, thus being in fluid connection with the ends and the outer surface 26 of the elongate body 14. The spool bore 94 may comprise any suitable size and geometry as needed. In the embodiment shown in FIG. 1, the spool bore 94 comprises a cylindrical geometry having a diameter between 200 and 500 micrometers. Of course, other sizes are contemplated.

The valve rod 98 is also preferably formed of a glass or ceramic material, although other materials may be utilized. In addition, the valve rod 98 is configured with a geometric size and shape similar to the spool bore 94. The valve rod 98 functions to displace bi-directionally within the spool bore 94 upon being actuated by actuating means, such as a solenoid 178 located about the second end 106 of the valve rod 98. The opposite end, first end 102, of the valve rod 98 is biased using a biasing means, such as spring 182. Therefore, upon selective actuation of the solenoid 178, which causes the valve rod 98 to selectively displace toward the biasing means, the first end 102 of the valve rod 98 has applied thereon an opposing force from the biasing means, which opposing force has a tendency to cause the valve rod 98 to displace in an opposite direction as that caused by the actuation of the solenoid 178. However, input into the solenoid causing the valve rod 98 to displace should be sufficient to overcome the biasing means, or spring 182, until removed, thus allowing the valve rod 98 to be selectively positioned about the various input and output ports formed in the spool bore 94. Once the input is removed, the biasing means causes the valve rod 98 to return to its initial starting position.

The valve rod 98 has formed therein one or more fluid passages, shown as fluid passages 110-a, 110-b, 110-c, and 110-d. These recesses are positioned in the valve rod 94 at specific locations to selectively and strategically open and close the input and output ports of the spool bore 94 depending upon the displacement position of the valve rod 98, which concept is discussed further below. The fluid passages 110 are formed into the valve rod 98 using one or more manufacturing methods, such as chemical or other etching, machining, or any others known in the art. Each fluid passage 110 is sized and configured to facilitate the flow of fluid through the spool bore 94 when positioned over an input or output port upon actuation and proper positioning of the valve rod 98.

As illustrated by the schematic diagram of FIG. 1, there are several fluid connections existing between the first and second fluid displacement bores 30 and 62, the spool bore 94, the source 2, the sink 4, the directional valve 230, and actuator 290. Beginning with the source 2, this is a pressurized fluid source capable of inputting or delivering a fluid, preferably a hydraulic or other incompressible fluid, under pressure to the quantum valve 12. As can be seen, the elongate body 14 has formed within its first end 18 an input port, shown as pressure input port 190, fluidly connected to the source 2.

Pressure input port 190 is fluidly connected to the spool bore 94 through pressure input port 126 leading into the spool bore 94. A corresponding pressure output port 122 leads out of the spool bore 94 and is fluidly connected to a pressure input port 50 formed in the first fluid displacement bore 30. Through this series of input and output ports and fluid interconnects between the first fluid displacement bore 30, the spool bore 94, and the source 2, the pressurized fluid is allowed to flow from the source 2, through the elongate body 14, and into the spool bore 94. Subsequently, depending upon the displacement position of the valve rod 98, the pressurized fluid is allowed to flow out of the spool bore 94 and into the first fluid displacement bore 30, wherein the pressurized fluid functions to displace the plug 42 within the first fluid displacement bore 30, as will be explained in further detail below.

The source 2 is also capable of delivering pressurized fluid to the opposite end of the first fluid displacement bore 30. Specifically, the source 2 comprises a fluid line that delivers pressurized fluid into the spool bore 94 through pressure input ports 194 and 134. Corresponding to pressure input port 134 is pressure output port 130 leading out of the spool bore 94. Pressure output port 130 is fluidly connected to pressure input port 58 formed in the first fluid displacement bore 30. This series of pressure input and output ports and fluid interconnects functions to cause pressurized fluid to flow from the source 2, through the elongate body 14 and into the spool bore 94. In addition, depending on the displacement position of the valve rod 98, the pressurized fluid from the source 2 is subsequently caused to flow from the spool bore 94 through the pressure output port 130 and into the first fluid displacement bore 30 through the pressure input port 58 formed therein, thus causing the plug 42 to displace within the first fluid displacement bore 30.

As can be seen, the pressure input port 50 is formed at one end of the fluid displacement bore 30 while the pressure input port 58 is formed at the opposite end of the fluid displacement bore 30. Thus, depending upon the displacement position of the valve rod 98, pressurized fluid is able to flow through these pressure input ports to bi-directionally displace the plug 42 within the first fluid displacement bore 30. Each displacement of the plug 42 caused to occur within the first fluid displacement bore 30 creates a corresponding volumetric fluid output.

Formed in the first end 34 of the first fluid displacement bore 30 is a return output port 46, which is fluidly connected to the spool port 94, and particularly the return input port 114 of the spool port 94. Corresponding to the return input port 114 is a return output port 118 which is fluidly connected to the sink 4. Upon displacement of the plug 42 from the second end 38 of the first fluid displacement bore 30 to the first end 34, fluid is able to flow out of the return output port 46, through the spool valve 94, and into the sink 4 upon proper positioning of the valve rod 98 to open the return input and output ports 114 and 118 formed in the spool bore 94. Likewise, the first fluid displacement bore 30 also has formed therein a return output port 54 which is fluidly connected to a return input port 138 formed in the spool bore 94. Corresponding to the return input port 138 is a return output port 142, also formed in the spool bore 94, and which is fluidly connected to a return output port 198 formed in the outer surface 26 of the elongate body 14. The return output port 198 is fluidly connected to the sink 4. Upon displacement of the plug 42 from the first end 34 to the second end 38 of the first fluid displacement bore 30, fluid is caused to flow out of the return output port 54, into the spool bore 94, out of the spool bore 94, out of the elongate body 14, and into the sink 4 upon proper positioning of the valve rod 98 to open the return input port 138 and the return output port 142. The return input and output ports 138 and 142 are opened by positioning the fluid passage 110-b about these ports.

In regards to the second fluid displacement bore 62, as also illustrated by the schematic diagram of FIG. 1, there are several fluid connections existing between the second fluid displacement bore 62, the spool bore 94, the source 2, the sink 4, and the directional valve 230 and actuator 290. From the source 2, pressurized fluid flows into the second end 22 of the elongate body 14 through a pressure input port 206 formed therein. As such, the pressure input port 206 is fluidly connected to the source 2. The pressure input port 206 is also fluidly connected to the spool bore 94 through a pressure input port 158, leading into the spool bore 94. A corresponding pressure output port 154 leads out of the spool bore 94 and is fluidly connected to a pressure input port 82 formed in the first end 66 of the second fluid displacement bore 62. Through this sequence of input and output ports and fluid interconnects between the second fluid displacement bore 62, the spool bore 94 and the source 2, the pressurized fluid is caused to flow from the source 2, through the elongate body 14, and into the spool bore 94. Subsequently, depending upon the displacement position of the valve rod 98, the pressurized fluid is caused to flow out of the spool bore 94 and into the second fluid displacement bore 62, wherein the pressurized fluid functions to displace the plug 74 within the second fluid displacement bore 62, as will be explained in further detail below.

The source 2 is also capable of delivering pressurized fluid to the opposite or second end 70 of the second fluid displacement bore 62. Specifically, the source 2 is fluidly coupled to and configured to deliver pressurized fluid into the spool bore 94 through pressure input ports 210 and 166. Corresponding to pressure input port 166 is pressure output port 162 leading out of the spool bore 94. Pressure output port 162 is fluidly connected to pressure input port 90 formed in the second fluid displacement bore 62. This sequence of pressure input and output ports and fluid interconnects functions to cause pressurized fluid to flow from the source 2, through the elongate body 14 and into the spool bore 94. In addition, depending on the displacement position of the valve rod 98, the pressurized fluid from the source 2 is subsequently caused to flow from the spool bore 94 through the pressure output port 162 and into the second fluid displacement bore 62 through the pressure input port 90 formed therein, thus causing the plug 74 to displace within the second fluid displacement bore 62. As can be seen, the pressure input port 82 is formed at one end of the fluid displacement bore 62 while the pressure input port 90 is formed at the opposite end of the fluid displacement bore 62. Thus, depending upon the displacement position of the valve rod 98, pressurized fluid is able to flow through these pressure input ports to bi-directionally displace the plug 74 within the second fluid displacement bore 62. Each displacement of the plug 74 within the second fluid displacement bore 62 creates a corresponding volumetric fluid output.

Likewise, formed in the first end 66 of the second fluid displacement bore 62 is a return output port 78, which is fluidly connected to the spool port 94, and particularly the return input port 146 of the spool port 94. Corresponding to the return input port 146 is a return output port 150 which is fluidly connected to the sink 4. Upon displacement of the plug 74 from the second end 70 of the second fluid displacement bore 62 to the first end 66, fluid is caused to flow out of the return output port 78, through the spool valve 94, and into the sink 4 upon proper positioning of the valve rod 98 to open the return input and output ports 146 and 150 formed in the spool bore 94. Likewise, the second fluid displacement bore 62 also has formed therein a return output port 86 which is fluidly connected to a return input port 170 formed in the spool bore 94. Corresponding to the return input port 170 is a return output port 174, also formed in the spool bore 94, and which is fluidly connected to a return output port 214 formed in the outer surface 26 of the elongate body 14. The return output port 214 is fluidly connected to the sink 4. Upon displacement of the plug 74 from the first end 66 to the second end 70 of the second fluid displacement bore 62, fluid is caused to flow out of the return output port 86, into and out of the spool bore 94, out of the elongate body 14, and into the sink 4, upon proper positioning of the valve rod 98 to open the return input ports 170 and 174. The return input and output ports 170 and 174 are opened by positioning the fluid passage 110-d about these ports.

In the embodiment shown, the pressure input ports formed in the first and second fluid displacement bores, respectively, are located on or substantially proximate the ends of the fluid displacement bores, thus allowing pressurized fluid to enter the fluid displacement bores and displace the plugs contained therein as far a distance as possible. Likewise, the return output ports formed in the first and second fluid displacement bores are also located on or substantially proximate the ends of the fluid displacement bores, thus allowing as much fluid as possible that is displaced by the plugs to exit the fluid displacement bores before being closed off by the plugs, respectively. Although this arrangement is preferred, the present invention is not limited to this. Indeed, other locations are contemplated, each of which are considered to fall within the scope of the invention as claimed.

The fluid connections between the first and second fluid displacement bores 30 and 62 and the spool bore 94 may be by any known means in the art. Preferably, however, because of the micro miniature size of the quantum valve and the quantum fluid transfer system 10 in general, the various bores are fluidly connected to one another as needed using such techniques as those described in the above identified U.S. patent application Ser. No. 12/072,133, filed on May 8, 2007 and entitled, "Micro-fluid Transfer System." Other techniques may also be used to fluidly connect the spool bore to the outer surface of the elongate body.

In operation of the quantum fluid transfer system 10 as described above, the valve rod 98 is actuated to control the displacement of the plugs 42 and 74, and therefore the fluid output from the quantum valve 12. By activating the solenoid 178, or other actuation means, the valve rod 98 is displaced within the spool bore 94 to position the fluid passages 110 about the proper input and/or output ports and to facilitate fluid transfer or flow through the quantum valve 12. The biasing element or member, such as the spring 182, functions to induce or apply an opposing or counter force to the valve rod 98, which force has a tendency to return the valve rod 98 to its initial starting position.

In one exemplary embodiment, in its initial, non-actuated starting position, the valve rod 98 closes off all of the input and output ports within the quantum valve 12, thus prohibiting the transfer of fluid therethrough. To output fluid from the quantum valve 12, the actuating means is actuated to displace the valve rod 98 so that the fluid passage 110-a opens the pressure input and output ports 126 and 122, respectively, formed in the spool bore 94. Since these ports are fluidly connected to the pressure input port 190, which is fluidly connected to the source 2, pressurized fluid is allowed to pass through the pressure input and output ports 126 and 122, respectively, and into the first fluid displacement bore 30 via pressure input port 50. As the pressurized fluid enters the first fluid displacement bore 30, it induces a resulting force on the plug 42 located at the first end 34. If the force is sufficient to overcome the plug 42 and any additional static forces acting on the plug 42, the plug 42 is caused to displace away from the pressure input port 50 and towards the second end 38 of the first fluid displacement bore 30. As the plug 42 displaces, it also displaces the volume of fluid present within the fluid displacement bore 30. This volume of fluid is allowed to escape or exit the first fluid displacement bore 30 through the return output port 54, which is fluidly connected to the return inlet port 138 of the spool bore 94. The output fluid is then routed to the sink for later release.

With the valve rod 98 is this same position, the fluid passage 110-b is positioned to open the return inlet and outlet ports 138 and 142, thus allowing fluid to flow from the return outlet port 54, through the return inlet and outlet ports 138 and 142 of the spool bore 94, through the return outlet port 198 of the elongate body 14, and into the sink 4. The displacement of the plug 42 continues until stopped, thus allowing the quantum valve 12 to continually output fluid until that time. In the embodiment shown, fluid is output through the return outlet port 54 until the plug 42 closes off this port, or is otherwise stopped. As such, the quantity of fluid output is proportional to the displacement distance of the plug 42 within the fluid displacement bore 30, taking into account the volumes of the transitional bore 30 and the plug 42. Specifically, it can be the that the volumetric output of the quantum valve 12 for a single one-way linear displacement of the plug 42 is equivalent to the volume of the fluid displacement bore 30 minus the volume of the plug 42, or $V_{out} \approx V_{bore} - V_{plug}$, assuming the plug 42 is allowed to displace fully from end to end. Thus, if the fluid displacement bore 30 and the plug 42 are both cylindrical, $V_{out} \approx \pi r^2 h$ (bore)$-\pi r^2 h$ (plug), where h=the height or length of the fluid displacement bore 30 and the plug 42, respectively. Of course, the size of the fluid displacement bore 30 and the plug 42 may vary between systems, and their shape may be other than cylindrical, thus producing relatively different volumetric equations and outputs. As will be discussed below, it is also possible to operably couple several quantum valves together to produce cumulative fluid outputs. In the event multiple fluid displacement bores are utilized to produce a cumulative fluid output, it can be the that $V_{out,total} \approx V_{out,1} + V_{out,2} + V_{out,n}$, where $V_{out,1}$ represents the volume of fluid output by operation of the first fluid displacement bore during a single cycle, $V_{out,2}$ represents the volume of fluid output by operation of the second fluid displacement bore during a single cycle, and $V_{out,n}$ represents the volume of fluid output by any subsequent number of fluid displacement bores.

Although the above discussion has centered around the one-way displacement of the plug 42, and the first stage of one cycle, it is intended that one cycle of the quantum valve 12 be defined as the bi-directional displacement of the plug 42 within the fluid displacement bore 30. In other words, one cycle may equivalent to the displacement of the plug 42 back and forth once. In order to displace the plug 42 in the opposite direction as that described above, and thus effectuate the second stage of one cycle, the valve rod 98 is actuated to be repositioned so as to close the pressure input and output ports 126 and 122 formed in the spool bore 94, and open the return input and output ports 114 and 118, also formed in the spool bore 94. To open the return input and output ports 114 and 118, the valve rod 98 is positioned so that the fluid passage 110-a is positioned about these ports. Repositioning the valve rod 98 in this manner also functions to close the return inlet and outlet ports 138 and 142, and open the pressure inlet and outlet ports 134 and 130 by positioning the fluid passage 110-b about these ports. Opening ports 134 and 130 allows pressurized fluid from the source 2 to enter the pressure input port 194, pass through the spool bore 94 and out of the pressure output port 130. Since the pressure output port 130 is fluidly coupled to the pressure input port 58 formed in the second end 38 of the first fluid displacement bore 30, pressurized fluid is allowed to enter therein. As pressurized fluid enters the first fluid displacement bore 30 through the pressure input port 58, a force is induced on the plug 42 causing it to displace away from the second end 38 towards the first end 34. As the plug 42 is displaced, a volumetric quantity of fluid exits the fluid displacement bore 30 through the return output port 46. Fluid is expelled from the fluid displacement bore 30 until the plug 42 is stopped. Once the plug 42 stops, the valve rod 98 may be actuated again to repeat the process. As can be seen, one cycle produces an output equivalent to twice the volume of the fluid displacement bore minus the volume of the plug. In other words, the total volumetric fluid output for one cycle may be described as $V_{out,total} \approx 2(V_{out}) \approx 2(V_{bore} - V_{plug})$. It is noted that this output of fluid is pressurized, and is stored under pressure in the sink 4.

The quantum valve 12 operates with the second fluid displacement bore 62 in a similar manner as with the first fluid displacement bore 30 to produce a proportional fluid output, the details of which are not provided. It is noted though that the second fluid displacement bore 62 may receive pressurized fluid from the same or a different source. In addition, the second fluid displacement bore 62 may output fluid to the same or a different sink. Although the first and second fluid displacement bores 30 and 62 are shown as receiving fluid from the same source and outputting fluid to the same sink, this is not required, nor should it be construed as limiting the present invention in any way.

Moreover, the second fluid displacement bore 62 may be operated simultaneously with the first fluid displacement bore 30, or it may be operated independently, to output a volumetric quantity of pressurized fluid to the sink 4. Preferably, the first and second fluid displacement bores 30 and 62 are configured to operate in synchronization, or in phase, with one another. However, if needed, they may be configured to operate out of phase.

As indicated above, and although not required, the quantum valve 12 may further comprise additional fluid displacement bores configured to output a volumetric quantity of fluid in a similar manner as the first and second fluid displacement bores 30 and 62 shown. These too may be configured to operate in or out of phase with one another. In addition, as will be apparent to those skilled in the art, the different fluid displacement bores in the quantum valve may be of different size and/or shape, thus outputting different volumetric quantities of fluid to the sink.

Figure 2:
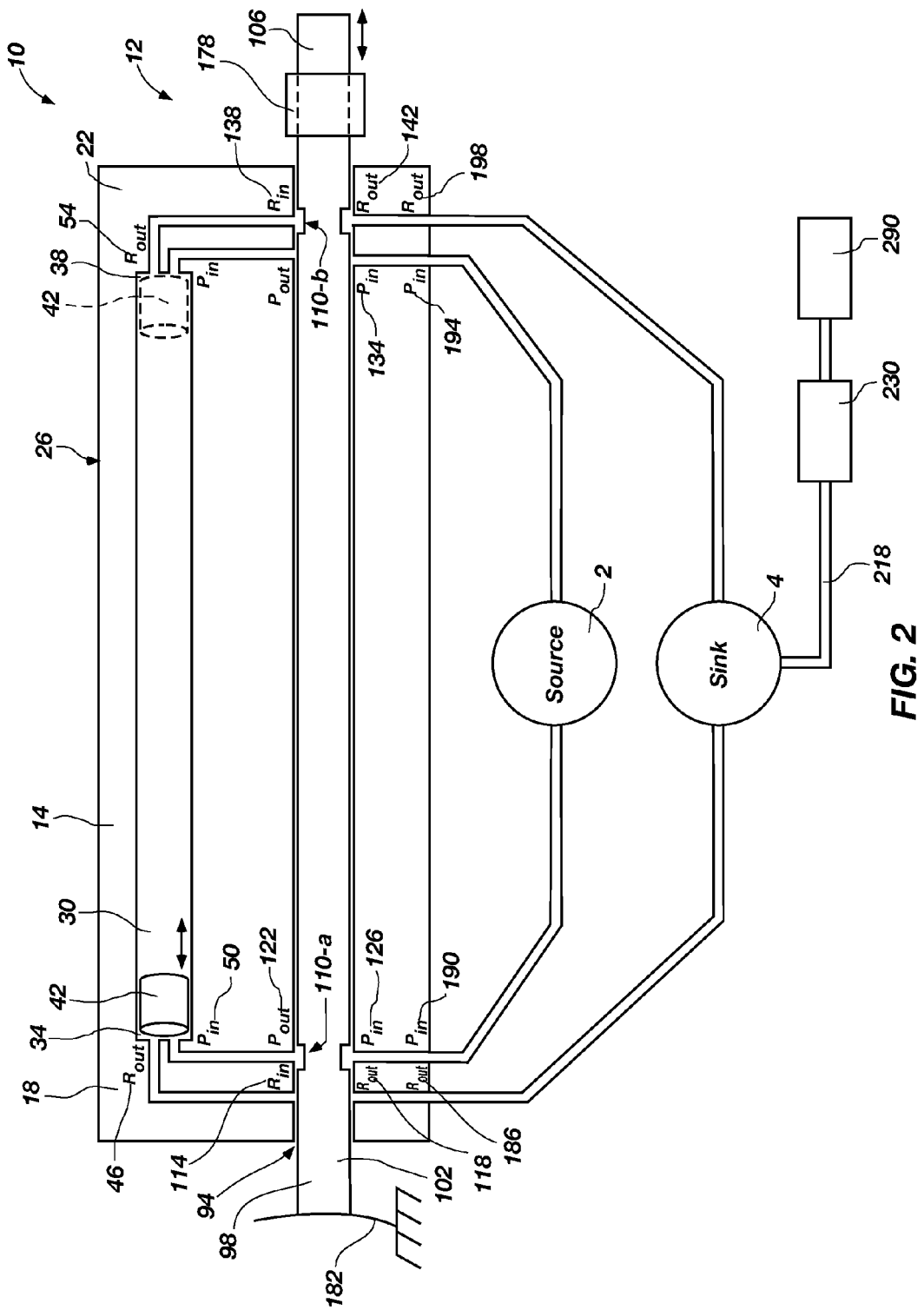
FIG. 2 illustrates a schematic cross section of a miniature quantum fluid transfer system in accordance with another embodiment of the present invention.

FIG. 2 illustrates the present invention quantum fluid transfer system according to another exemplary embodiment. Specifically, FIG. 2 illustrates the quantum fluid transfer system 10, and particularly the quantum fluid valve 12, as comprising a single fluid displacement bore 30. This particular embodiment functions identical to the embodiment described above and shown in FIG. 1, without the presence of a second fluid displacement bore. As such, the description set forth above is incorporated herein and may be referred to in whole or in part to describe the structure and operation of the embodiment shown in FIG. 2.

Figure 3:
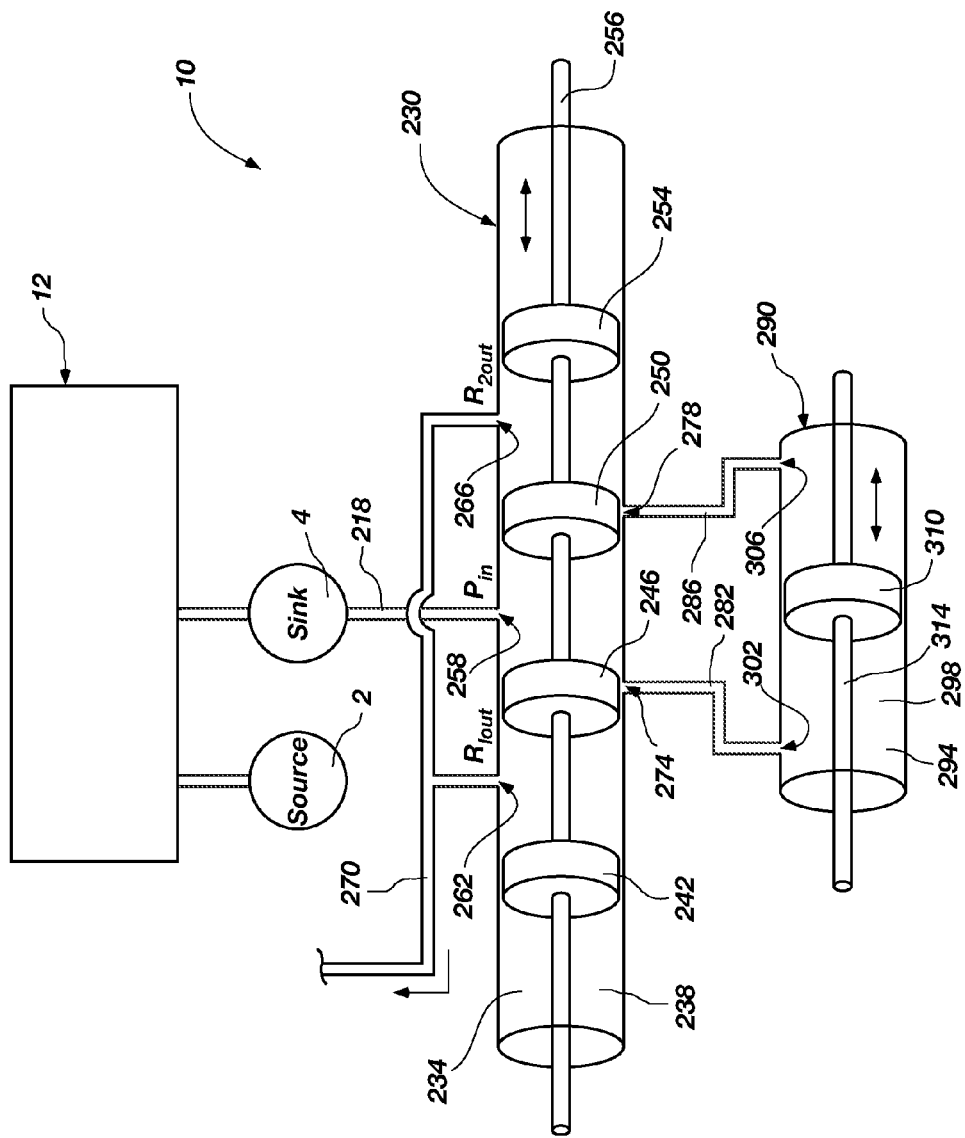
FIG. 3 illustrates a schematic cross section of a directional valve in accordance with an embodiment of the present invention configured to operate with the quantum valve for the purpose of controlling an actuator.

Referring to FIGS. 1 and 3, the present invention quantum fluid transfer system further comprises a directional or similar valve configured to operate with the quantum valve, wherein the quantum valve and directional valve function in combination for the purpose of controlling an actuator. As shown, the quantum valve 12 is operably and fluidly coupled to the directional valve 230 through the sink 4. As the quantum valve 12 outputs pressurized fluid, the pressurized fluid is directed to and stored within a sink 4. Fluidly coupling the sink 4 to the directional valve 230 is a fluid connection 218 that facilitates the flow of pressurized fluid from the sink 4 to be input into the directional valve 230 through the pressure input port 258 formed in the elongate body 234. Through this pressure input port 258, pressurized fluid is allowed to enter into the interior 238 of the elongate body 234 of the directional valve 230. In other words, output from the sink 4 is input into the directional valve 230. As such, it can be that the quantum valve 12 functions as a pilot valve to provide a control input to the directional valve 230.

The directional valve 230 is shown as a four-way spool valve, thus comprising a series of spools, namely spools 242, 246, 250, and 254, each interconnected by a rod 256. The directional valve 230 further comprises several input and output ports, namely pressure input port 258, first inlet/output port 274, second inlet/output port 278, return output port 262, and return output port 266. The spools are strategically located and are displaceable about the various input and output ports, such that pressurized fluid entering into the pressure input port 258 may be utilized to drive the actuator 290. In operation, as pressurized fluid is output to the quantum valve 12 from the source 2, and from the quantum valve 12 to the sink 4, the directional valve 30 functions to direct the subsequent flow of fluid from the sink 4 through the directional valve 230 to the actuator 290, thereby actuating or driving the actuator 290.

The actuator 290 may be any known in the art. As shown, the actuator 290 comprises a main body 294 having a plurality of ports formed therein to provide access to the interior 298. The actuator comprises a first port 302 formed in one end of the main body 294 and a second port 306 formed in the opposite end of the main body 294. Operably supported within the interior 298 of the actuator 290 is a spool 310 having a rod 314 coupled thereto, which may be coupled to a load. The spool 310 is configured to displace bi-directionally within the interior 298 and about the first and second ports 302 and 306 in response to the input of pressurized fluid as received from the directional valve 230. Unlike prior related directional valves, the present invention quantum fluid transfer system 10, and particularly the configuration and function of the quantum valve 12, allows the directional valve 290 to function in a binary or digital manner, rather than in an analog manner. In addition, the directional valve 290 is not required to operate to produce an output proportional to its input. Instead, the quantum valve(s) 12 of the present invention operate(s) with proportionality, thus allowing the directional valve 230 to digitally switch between one operating position or the other to actuate the actuator 290. The volume of fluid output from the quantum valve(s) 12 determines the proportional displacement of the actuator 290 fluidly coupled to the directional valve 230. Thus, a single quantum valve may be operated to displace the actuator a pre-determined distance, based on the $V_{out}$ from the quantum valve and the size of the actuator, taking into account all area reductions or force multiplications. In addition, in the event multiple quantum valves are utilized to produce a cumulative volumetric fluid output, the actuator will move in proportion to the $V_{out,total}$ produced by each of these quantum valves. As such, the actuator may be specifically and digitally controlled according to the operation and actuation of the quantum valve(s) in combination with the directional valve 230.

For instance, the rod 256 in the directional valve 230 may be actuated to displace the spools 246 and 250 to be positioned to the left of the first and second inlet/output ports 274 and 278, respectively, thus opening these ports. In this operating position, pressurized fluid supplied to the directional valve 230 by actuation of the quantum valve 12 is allowed to enter the pressure inlet port 258 from the sink 4 and exit the directional valve 230 through the inlet/outlet port 274. Pressurized fluid exiting the inlet/outlet port 274 subsequently enters the fluid line 282, which is fluidly connected to the first inlet outlet port 302 formed in the actuator 290, thus actuating the actuator 290 and displacing the spool 310 away from the first inlet/outlet port 302. Displacement of the spool 310 causes fluid on the opposite side of the spool 310 to exit the actuator 290 through the second inlet/outlet port 306 and into the directional valve 230. The second input/output port 306 of the actuator 230 is fluidly connected to the second input/output port 278 of the directional valve 230 via the fluid line 286. In this operating state, fluid flows from the directional valve 230 through the return outlet port 266, where it travels through the fluid line 270 to the return fluid reservoir. In addition, displacement of the actuator 290 is proportional to the input of pressurized fluid as received from the quantum valve 12 and directed by the directional valve 230.

To displace the spool 310 in the opposite direction, the quantum valve 12 is actuated to supply pressurized fluid to the directional valve 230. The directional valve 230 is actuated to displace the spools 246 and 250 so that they are positioned to the right of the first and second input/output ports 274 and 278, respectively, thus opening these ports. In this operating position, pressurized fluid supplied to the directional valve 230 is allowed to enter the pressure inlet port 258 from the sink 4 and exit the directional valve 230 through the inlet/outlet port 278. Pressurized fluid exiting the second inlet/outlet port 278 subsequently enters the fluid line 286, which is fluidly connected to the second inlet outlet port 306 formed in the actuator 290, thus actuating the actuator 290 and displacing the spool 310 away from the second inlet/outlet port 306. Displacement of the spool 310 causes fluid on the opposite side of the spool 310 to exit the actuator 290 through the first inlet/outlet port 302 and into the directional valve 230. As mentioned, the first input/output port 302 of the actuator 230 is fluidly connected to the first input/output port 274 of the directional valve 230 via the fluid line 282. In this operating state, fluid flows from the directional valve 230 through the return outlet port 262, where it travels through the fluid line 270 to the return fluid reservoir. This process is repeated as often as needed to control the actuator and load to which it is attached.

Figure 4:
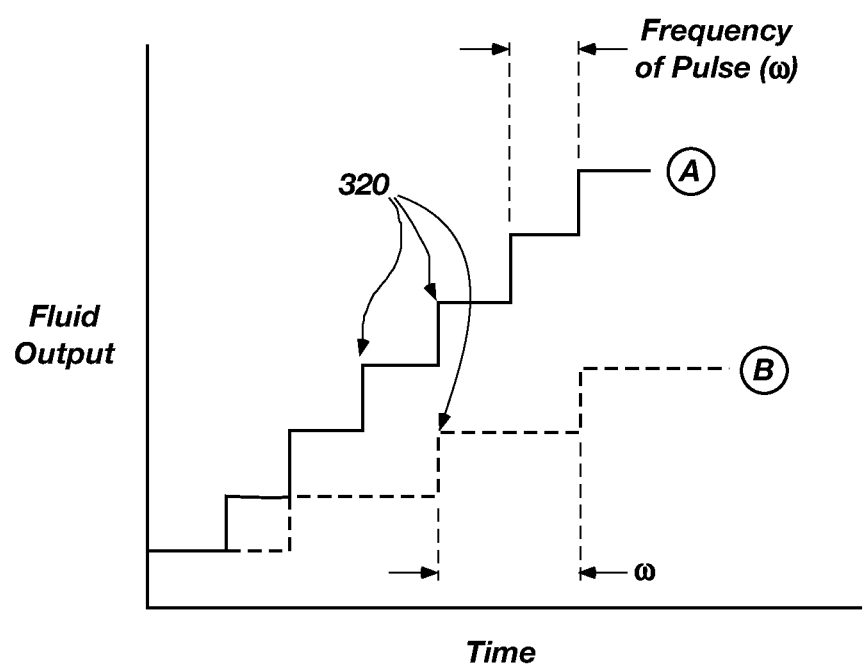
FIG. 4 illustrates a graphical depiction of the volumetric fluid output of the quantum valve over time, and the effects on the fluid output of the change in the frequency of actuation of the quantum valve.

With reference to FIG. 4, illustrated is a graphical depiction of the volumetric fluid output of the quantum valve over time, and the effects on the fluid output of the change in the frequency of actuation of the quantum valve. As shown, the frequency of actuation of the quantum valve, and particularly the spool valve, can vary as desired. Varying the frequency determines the volumetric output of fluid out of the quantum valve, into the sink, into the directional valve, and subsequently the actuator, if attached. As shown, operating the quantum valve at higher frequencies, depicted by graph A, produces a higher fluid output, or volume of fluid, to the directional valve. Conversely, operating the quantum valve at lower frequencies, depicted by graph B, produces lower levels of fluid output, respectively, over a given duration of time. In translation, the actuation frequency of the quantum valve and the volumetric output of each pulse determines, proportionally, the displacement distance of the actuator. The amount of fluid output on each pulse, shown as output 320, is dependent upon the size of the fluid displacement bores and the displacement distance of the plugs contained therein.

Figure 6:
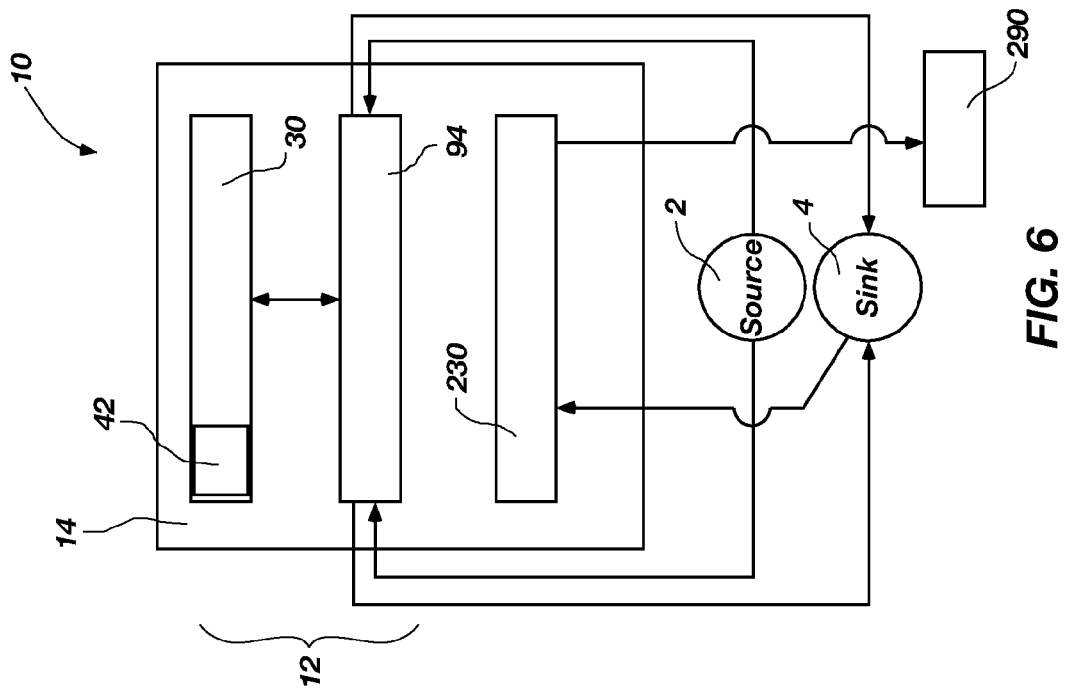
FIG. 6 illustrates a schematic view another embodiment of the present invention quantum fluid transfer system, wherein the quantum valve and directional valve are packaged together.
Figure 5:
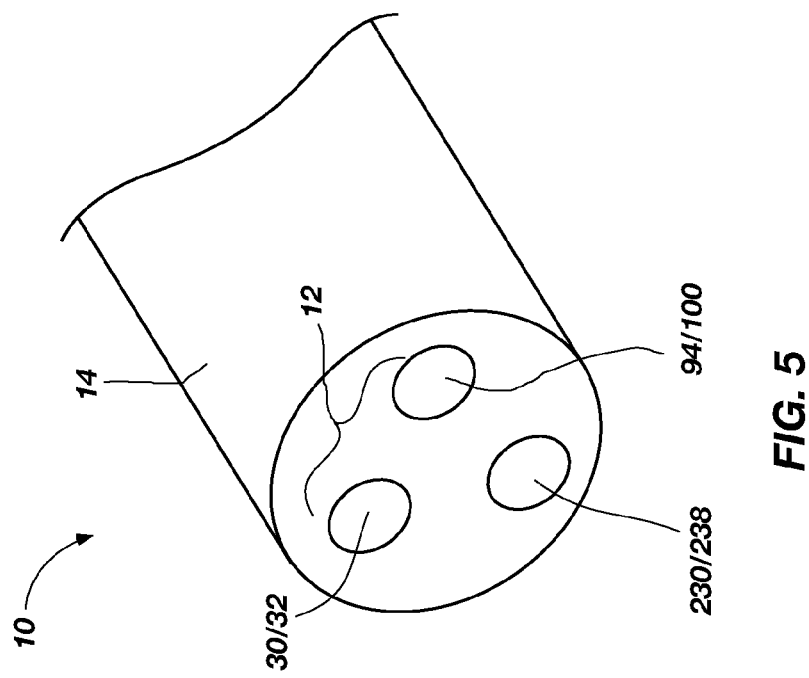
FIG. 5 illustrates a perspective view of another embodiment of the present invention quantum fluid transfer system, wherein the quantum valve and directional valve are packaged together.

With reference to FIGS. 5 and 6, illustrated are perspective and schematic views, respectively, of another exemplary embodiment of the present invention quantum fluid transfer system, wherein the quantum valve and directional valve are packaged together. Specifically, FIGS. 5 and 6 illustrate the quantum fluid transfer system 10 as comprising the quantum valve(s) 12, made up of the transition valve 32, the spool valve 100, and the directional valve 230 embodied together in the elongate body 14 as a single package or structure. In this configuration, the fluid displacement bore 30 is fluidly and operably connected to the spool bore 94. The spool bore 94 is operably and fluidly connected to the source 2 and sink 4. The directional valve 230 is fluidly connected to the sink 4 and the actuator 290. Again, the fluid interconnects between each of these elements may be formed in the elongate body 14, or otherwise provided for, in accordance with previous disclosures made, which are incorporated herein, as indicated above.

It will be appreciated that multiple quantum valves or a plurality of quantum valves can be operable individually to produce a pre-determined corresponding output, or in combination with one another to produce a pre-determined cumulative fluid output. In other words, the present invention contemplates a quantum fluid transfer system that is capable of utilizing a plurality of quantum valves, each configured to actuate an actuator either alone or in combination with one or more additional quantum valves. Thus, it can be the that the quantum fluid transfer system may comprise a serial or parallel fluid output from multiple quantum valves. Utilizing two or more quantum valves to produce cumulative fluid output to a single actuator allows the system to achieve different digital fluid output levels and to subsequently produce different or variable states of actuation within the actuator. This is especially true when the quantum valves, and particularly the fluid displacement bores of the quantum valves, operating in parallel are different sizes configured to output different volumes of fluid. In other words, different sized quantum valves capable of producing different levels of output fluid can be configured to operate with one another. Thus, any single output level can be achieved by actuating a single corresponding quantum valve. In addition, cumulative output levels are made possible by simultaneously actuating two or more quantum valves.

Figure 7:
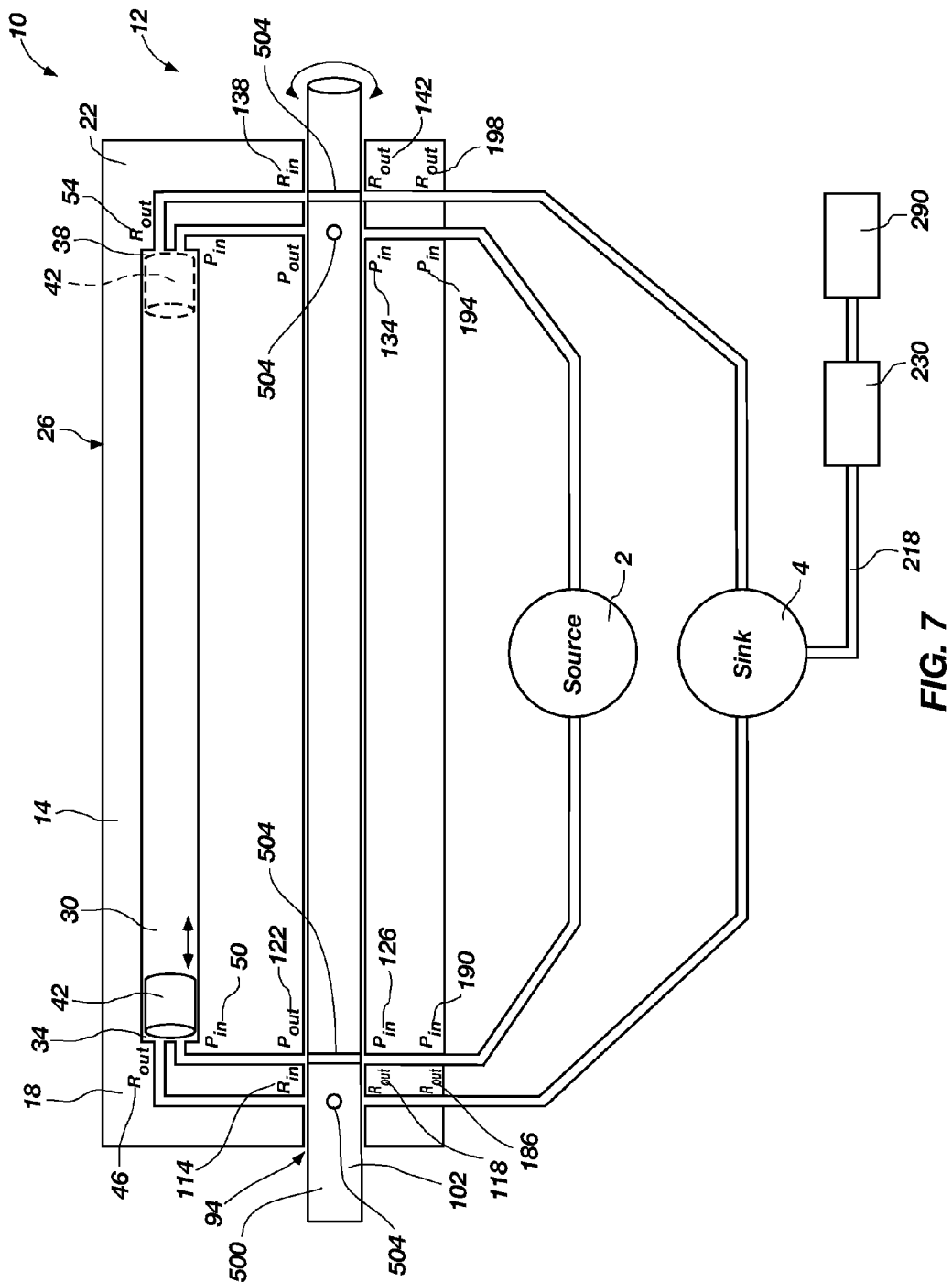
FIG. 7 illustrates a schematic cross section of a miniature quantum fluid transfer system in accordance with another embodiment of the present invention.

FIG. 7 illustrates the present invention quantum fluid transfer system according to another exemplary embodiment. Specifically, FIG. 7 illustrates the quantum fluid transfer system 10, described above and shown in FIGS. 1-2, and particularly the quantum fluid valve 12, as comprising a single fluid displacement bore 30. This particular embodiment functions identical to the embodiment described above and shown in FIGS. 1-2, without the presence of a second fluid displacement bore. As such, the description set forth above is incorporated herein and may be referred to in whole or in part to describe the structure and operation of the embodiment shown in FIG. 7.

Additionally, the quantum fluid transfer system shown in FIG. 7 can include a rotating rod 500 that can be driven or rotated by a motor (not shown). The rotating rod can have fluid passages formed therein in the form of orifices or through holes 504 that can align with the inlets and outlets of the quantum fluid transfer system 10 and the inlets and outlets of the fluid source 2 and sink 4. The orifices 504 can be radially offset with one another so as to allow passage of fluid through the rotating rod at varying intervals as the rod 500 rotates in the spool bore 94. In one aspect, alternating orifices 504 can be oriented orthogonally to one another. The orifices can also be spaced apart at a desired distance in order to minimize internal bypass leakage. The flow rate of fluid through the rotating rod is proportional to the frequency of the rod rotation, which is proportional to the speed of the motor. In this way, the rotating rod can pulse fluid into the displacement bore 30 similar to the way the valve rod 98 allows fluid into the quantum fluid transfer system 10, as described above and shown in FIGS. 1-2.

Figure 8:
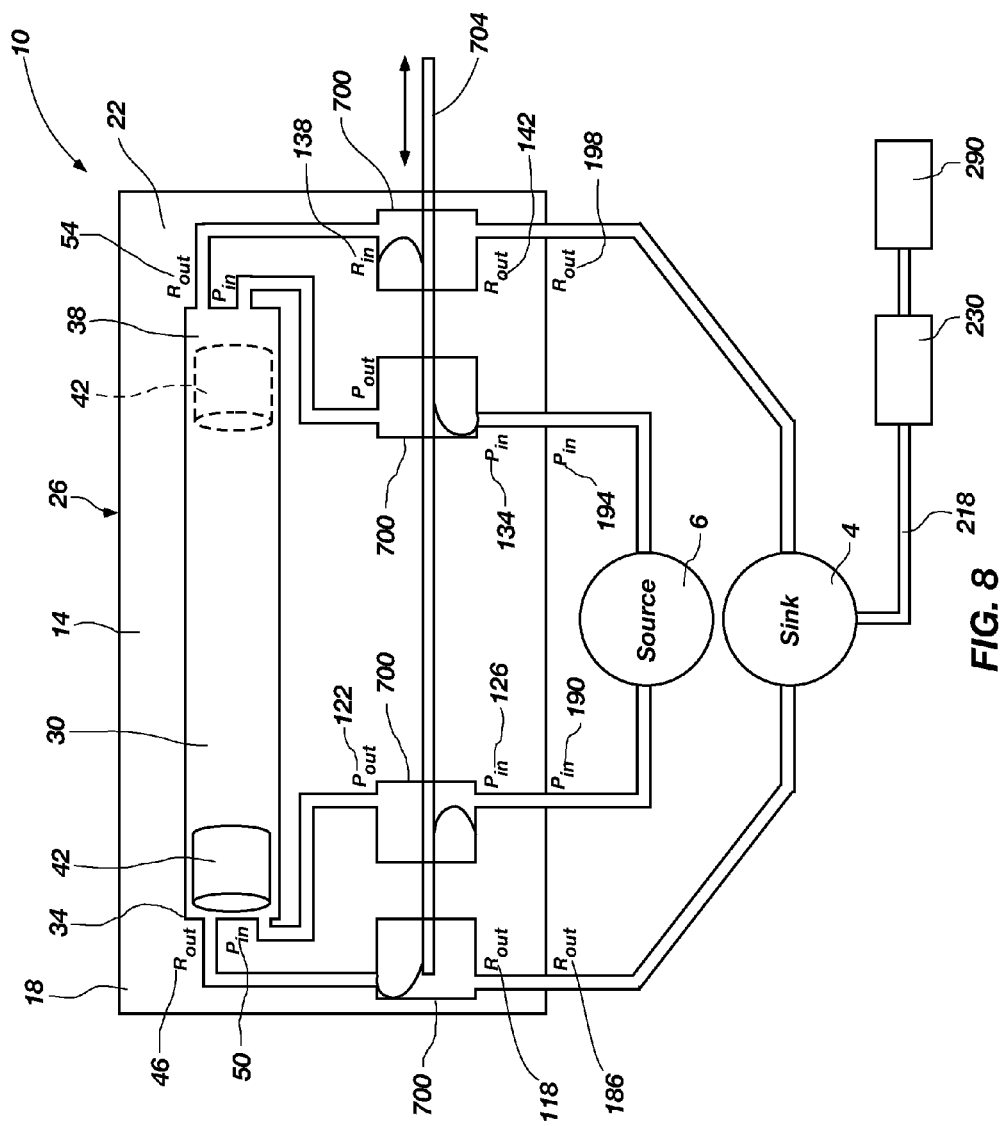
FIG. 8 illustrates a schematic cross section of a miniature quantum fluid transfer system in accordance with another embodiment of the present invention.

FIG. 8 illustrates the present invention quantum fluid transfer system according to another exemplary embodiment. Specifically, FIG. 8 illustrates the quantum fluid transfer system 10, described above and shown in FIGS. 1-2, and particularly the quantum fluid valve 12, as comprising a single fluid displacement bore 30. This particular embodiment functions identical to the embodiment described above and shown in FIGS. 1-2, without the presence of a second fluid displacement bore. As such, the description set forth above is incorporated herein and may be referred to in whole or in part to describe the structure and operation of the embodiment shown in FIG. 8.

Additionally, the quantum fluid transfer system shown in FIG. 8 can include a plurality of band valves 700 or an array of band valves, as known in the art. The band valves can be coupled to a translating rod 704 that can reciprocate back and forth to actuate the band valves. The band valves can be actuated in a desired sequence to pulse fluid into the displacement bore 20 similar to the way the valve rod 98 allows fluid into the quantum fluid transfer system 10, as described above and shown in FIGS. 1-2.

FIGS. 7 and 8 illustrate additional implementations for the directional valve used to alternately place one end of the second chamber in which the movable plug is located in fluid communication with the source while the other end of the second chamber is placed in fluid communication with the sink. It will be appreciated that other implementations, as known in the art, could also be used to fluidly couple the source and sink to alternating opposite ends of the movable plug.

The present invention further features a method for regulating the fluid flow through a valve including obtaining a quantum valve with a first chamber disposed in a valve body and having at least one inlet port and at least one outlet port. The quantum valve can also have a valve rod movably disposed in the first chamber. The valve rod can have a plurality of fluid passages spaced longitudinally along the valve rod. The valve rod can be movable to align at least one of the plurality of fluid passages with one of the inlet ports and at least one of the plurality of fluid passages with one of the outlet ports in order to allow fluid to flow through the selected inlet and outlet ports corresponding to the selected fluid passages. The quantum valve can also have a second chamber disposed in the valve body that can be in fluid communication with the first chamber at a first end and a second end of the second chamber. The quantum valve can also have a plug that can be movably disposed in the second chamber between the first end and the second end. The method for regulating flow can include causing the first chamber to be in fluid communication with a fluid source. The valve rod can be positioned to permit fluid from the source to enter the first chamber and the first end of the second chamber, and to cause the plug to displace within the second chamber to dispense a volume of fluid from a second end of the second chamber.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

The invention claimed is:

1. A miniature quantum valve configured to regulate the flow rate of a fluid by allowing passage of very small, discrete increments of fluid through the valve, comprising:
    a) a valve body having first and second chambers in fluid communication with each other, and each having first and second ends, the first chamber having at least one pressure inlet to receive pressurized fluid and at least one return outlet to release fluid;
    b) a valve rod movably disposed in the first chamber, and having a plurality of fluid passages spaced longitudinally along the valve rod, the valve rod being movable to align one of the fluid passages with one of the at least one pressure inlet or the at least one return outlet in the first chamber to allow fluid to flow through the first chamber; and
    c) a plug movably disposed in the second chamber between the first and second ends of the second chamber, the plug being configured to move toward one of the first or second ends upon a volume of pressurized fluid entering the second chamber from the first chamber at the other of the first or second ends, and to direct a corresponding volume of fluid out of the second chamber at the end opposite that end in which the fluid entered, and ultimately out the at least one return outlet, wherein the valve rod and the plug are operable to direct passage of discrete increments of pressurized fluid out of the second chamber to regulate the flow rate of the fluid, and wherein the pressurized fluid is utilized by a subsequent hydraulic device.

2. The quantum valve of claim 1, wherein the valve body comprises:
    a) a first pressurized fluid passageway extending between the first ends of the first and second chambers, respectively, to enable the flow of the pressurized fluid from a pressurized fluid source to the first end of the second chamber through one of the at least one pressure inlets;
    b) a first return fluid passageway extending between the first ends of the first and second chambers, respectively, to enable the flow of fluid from the first end of the second chamber to a fluid sink through one of the at least one return outlets;
    c) a second pressurized fluid passageway extending between the second ends of the first and second chambers, respectively, to enable the flow of the pressurized fluid from a pressurized fluid source to the second end of the second chamber through one of the at least one pressure inlets; and
    d) a second return fluid passageway extending between the second ends of the first and second chambers, respectively, to enable the flow of fluid from the second end of the second chamber to the fluid sink through one of the at least one return outlets.

3. The quantum valve of claim 1, wherein the valve body comprises:
    a third chamber having a plug movable between a first end and a second end of the third chamber and configured to move toward the first or second end when a volume of fluid enters the third chamber from the first chamber at the other of the first or second end, and to direct a corresponding specified volume of fluid out of the third chamber at the end opposite the end in which the fluid entered.

4. The quantum valve of claim 1, wherein the at least one pressure inlet of the first chamber is in fluid communication with a common pressurized fluid source, and the at least one return outlet of the first chamber is in fluid communication with a common fluid sink.

5. The quantum valve of claim 1, wherein the at least one return outlet is in fluid communication with a directional valve.

6. The quantum valve of claim 5, wherein the directional valve further includes a four-way spool valve.

7. The quantum valve of claim 5, wherein the movement of the plug defines a discrete volume of fluid transferred to the directional valve in a discrete time so that the quantum valve allows the directional valve to function in a binary or digital manner.

8. The quantum valve of claim 1, wherein the at least one return outlet is in fluid communication with an actuator.

9. A miniature quantum valve configured to regulate the flow rate of a fluid by allowing passage of very small, discrete increments of fluid through the valve, comprising:
    a) a valve body having at least one pressure inlet to receive pressurized fluid, and at least one return outlet to release fluid;
    b) a first chamber disposed in the valve body and having at least one inlet port and at least one outlet port;
    c) a valve rod movably disposed in the first chamber and having a plurality of fluid passages spaced longitudinally along the valve rod, the valve rod being movable to align at least one of the plurality of fluid passages with one of the inlet ports of the first chamber, and to align at least one of the plurality of fluid passages with one of the outlet ports of the first chamber to allow fluid to flow through the first chamber;
    d) a second chamber disposed in the valve body and in fluid communication with the first chamber at first and second ends of the first chamber, respectively, via one of respective the inlet and outlet ports of the first chamber; and
    e) a plug movably disposed in the second chamber between the first end and the second end, the plug being movable toward the second end by fluid entering the first end and movable toward the first end by fluid entering the second end, the plug being configured to direct a volume of fluid out of the second chamber upon being displaced, wherein the valve rod and the plug are operable to direct passage of discrete increments of pressurized fluid out of the second chamber to regulate the flow rate of the fluid, and wherein the pressurized fluid is utilized by a subsequent hydraulic device.

10. The quantum valve of claim 9, wherein the valve body comprises:
   a) a first pressurized fluid passageway extending between the first ends of the first and second chambers, respectively, to enable the flow of the pressurized fluid from a pressurized fluid source to the first end of the second chamber through one of the at least one pressure inlets;
   b) a first return fluid passageway extending between the first ends of the first and second chambers, respectively, to enable the flow of fluid from the first end of the second chamber to a fluid sink through one of the at least one return outlets;
   c) a second pressurized fluid passageway extending between the second ends of the first and second chambers, respectively, to enable the flow of the pressurized fluid from a pressurized fluid source to the second end of the second chamber through one of the at least one pressure inlets; and
   d) a second return fluid passageway extending between the second ends of the first and second chambers, respectively, to enable the flow of fluid from the second end of the second chamber to the fluid sink through one of the at least one return outlets.

11. The quantum valve of claim 9, wherein the valve body comprises:
   a third chamber in the valve body, having a plug movable between a first end and a second end of the third chamber and configured to move toward the first or second end when a volume of fluid enters the third chamber from the first chamber at the other of the first or second end, and to push a corresponding volume of fluid out of the third chamber at the end opposite the end the fluid entered.

12. The quantum valve of claim 9, wherein the at least one pressure inlet is in fluid communication with a common pressurized fluid source, and the at least one return outlet is in fluid communication with a common fluid sink.

13. The quantum valve of claim 9, wherein the at least one return outlet is in fluid communication with a directional valve.

14. The quantum valve of claim 13, wherein the directional valve further includes a four-way spool valve.

15. The quantum valve of claim 13, wherein the movement of the plug defines a discrete volume of fluid transferred to the directional valve in a discrete time so that the quantum valve allows the directional valve to function in a binary or digital manner.

16. A method for regulating the fluid flow through a valve, comprising:
   a) obtaining a quantum valve comprising:
      i) a first chamber disposed in a valve body and having at least one inlet port and at least one outlet port;
      ii) a valve rod movably disposed in the first chamber and having a plurality of fluid passages spaced longitudinally along the valve rod, the valve rod being movable to align at least one of the plurality of fluid passages with one of the inlet ports and at least one of the plurality of fluid passages with one of the outlet ports to allow fluid to flow through the selected inlet and outlet ports corresponding to the selected fluid passages;
      iii) a second chamber, in fluid communication with the valve body and in fluid communication with the first chamber at a first end and a second end of the second chamber; and
      iv) a plug movably disposed in the second chamber between the first end and the second end to output a volume of fluid upon displacement, wherein the valve rod and the plug are operable to direct passage of discrete increments of pressurized fluid out of the second chamber to regulate the flow rate of the fluid;
   b) causing the first chamber to be in fluid communication with a fluid source;
   c) positioning the valve rod to permit fluid from the source to enter the first chamber and the first end of the second chamber; and
   d) causing the plug to displace within the second chamber in response to the fluid to dispense a volume of the fluid from a second end of the second chamber, wherein the pressurized fluid is utilized by a subsequent hydraulic device.

17. The method of claim 16, further comprising positioning the valve rod to permit fluid from the source to enter the first chamber and the second end of the second chamber, and to cause the plug to displace within the second chamber to direct a corresponding specified volume of fluid out of the first end of the second chamber.

18. The method of claim 16, wherein the plug is movable to the second end by fluid entering the first end and movable to the first end by fluid entering the second end, and being configured to push a volume of fluid out of the second chamber when moving between the first end and the second end of the second chamber.

19. The method of claim 16, further comprising moving the valve rod in the first chamber of the valve body to align a first fluid passage on the valve rod with a first inlet port and a first outlet port and a second fluid passage with a second inlet port and a second outlet port to allow a volume of fluid to flow through the first inlet and outlet port and into the first end of the second chamber in the valve body, where the fluid moves the plug from the first end to the second end and where the plug pushes a volume of fluid out of the second chamber from the second end.

20. The method of claim 19, further comprising moving the valve rod to align the first fluid passage with a third inlet and outlet port and the second fluid passage with a fourth inlet and outlet port to allow a volume of fluid to flow through the third inlet and outlet port and into the second end of the second chamber, where the fluid moves the plug from the second end to the first end and where the plug pushes a volume of fluid out of the second chamber from the first end.

21. A quantum fluid transfer and load actuating system, comprising:
   a quantum valve configured to operate with proportionality, and comprising:
      a valve body having at least one pressure inlet to receive pressurized fluid, and at least one return outlet to release fluid;
      a first chamber disposed in the valve body and having at least one inlet port and at least one outlet port;
      a valve rod movably disposed in the first chamber and having a plurality of fluid passages adapted to facilitate fluid flow through the first chamber through the inlet and outlet ports;
      a second chamber disposed in the valve body and in fluid communication with the first chamber via the inlet and outlet ports of the first chamber; and
      a plug movably disposed in the second chamber to output a volume of fluid upon displacement, wherein the valve rod and the plug are operable to direct passage of discrete increments of pressurized fluid out of the second chamber to regulate the flow rate of the fluid;
   a directional valve operable with the quantum valve to receive the discrete increments of pressurized fluid as output from the quantum valve, the directional valve operating in a binary or digital manner, rather than in an analog manner, being able to digitally switch between various operating positions upon receipt of the discrete increments of pressurized fluid; and an actuator operable by the directional valve, the specified volume of fluid output from the quantum valve determining a proportional displacement of the actuator.

* * * * *

UNITED STATES PATENT AND TRADEMARK OFFICE
CERTIFICATE OF CORRECTION

PATENT NO.        : 8,794,262 B2
APPLICATION NO.   : 13/590007
DATED             : August 5, 2014
INVENTOR(S)       : Stephen C. Jacobsen et al.

It is certified that error appears in the above-identified patent and that said Letters Patent is hereby corrected as shown below:

Title page, item [63] Related U.S. Application Data section, "Nov. 13, 2008" should be --May 8, 2008--.

Signed and Sealed this
Twenty-first Day of October, 2014

Michelle K. Lee
*Deputy Director of the United States Patent and Trademark Office*